(12) United States Patent
Krylov et al.

(10) Patent No.: US 10,713,359 B2
(45) Date of Patent: Jul. 14, 2020

(54) SYSTEM AND METHOD OF IDENTIFYING A MALICIOUS INTERMEDIATE LANGUAGE FILE

(71) Applicant: AO Kaspersky Lab, Moscow (RU)

(72) Inventors: Vladimir V. Krylov, Moscow (RU);
Alexander V. Liskin, Moscow (RU);
Alexey E. Antonov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 240 days.

(21) Appl. No.: 15/939,789

(22) Filed: Mar. 29, 2018

(65) Prior Publication Data

US 2019/0102549 A1 Apr. 4, 2019

Related U.S. Application Data

(60) Provisional application No. 62/574,271, filed on Oct. 19, 2017.

(30) Foreign Application Priority Data

Sep. 29, 2017 (RU) .................................. 2017133835

(51) Int. Cl.
*H04L 29/06* (2006.01)
*G06F 21/56* (2013.01)
(Continued)

(52) U.S. Cl.
CPC .............. *G06F 21/565* (2013.01); *G06F 8/42* (2013.01); *G06F 16/152* (2019.01);
(Continued)

(58) Field of Classification Search
CPC .... G06F 16/152; G06F 21/564; G06F 21/565; G06F 21/568; G06F 8/41; G06F 8/42; G06F 21/562; G06F 21/64; H04L 63/14
See application file for complete search history.

(56) References Cited

U.S. PATENT DOCUMENTS 8,375,450 B1 * 2/2013 Oliver ................... G06F 21/564
726/24
8,499,167 B2 7/2013 Malanov
(Continued)

FOREIGN PATENT DOCUMENTS

EP 3121750 A1 1/2017
RU 2628920 C2 10/2016

*Primary Examiner* — Tri M Tran
(74) *Attorney, Agent, or Firm* — Arent Fox LLP; Michael Fainberg

(57) ABSTRACT

Disclosed are systems and methods for detection of malicious intermediate language files. In one exemplary aspect, the system comprises a database comprising hashes of known malicious files, a resource allocation module configured to select a set of resources from a file being analyzed, a hash calculation module, coupled to the resource allocation module, configured to calculate a perceptive hash of the set of resources; and an analysis module, coupled to the other modules, configured to identify a degree of similarly between the set of resources and a set of resources from known malicious files by comparing the perceptive hash with perceptive hashes of the set of resources from known malicious files, determine a harmfulness of the file being analyzed based on the degree of similarity and remove or quarantine the file being analyzed when the harmfulness exceeds a predetermined threshold.

21 Claims, 3 Drawing Sheets

(51) Int. Cl.
  *G06F 8/41*   (2018.01)
  *G06F 16/14*  (2019.01)
  *G06F 21/64*  (2013.01)

(52) U.S. Cl.
  CPC .......... *G06F 21/562* (2013.01); *G06F 21/564* (2013.01); *G06F 21/568* (2013.01); *G06F 21/64* (2013.01); *H04L 63/14* (2013.01); *G06F 8/41* (2013.01)

(56) References Cited

U.S. PATENT DOCUMENTS

| | | |
|---|---|---|
| 8,769,683 B1 | 7/2014 | Oliver et al. |
| 9,384,364 B1 | 7/2016 | Ivanov et al. |
| 10,242,186 B2 | 3/2019 | Pavlyushchik et al. |
| 2005/0177736 A1* | 8/2005 | de los Santos ....... G06F 21/563 713/188 |
| 2016/0307094 A1* | 10/2016 | Davis .................... G06F 21/564 |
| 2016/0359842 A1 | 12/2016 | Solodovnikov et al. |
| 2019/0005238 A1* | 1/2019 | Breitenbacher ......... G06F 8/437 |

\* cited by examiner

SYSTEM AND METHOD OF IDENTIFYING A MALICIOUS INTERMEDIATE LANGUAGE FILE

CROSS REFERENCE TO RELATED APPLICATIONS

This application claims benefit of priority under 35 U.S.C. 119(a)-(d) to a Russian Patent Application No. 2017133835 filed on Sep. 29, 2017, and the benefit of priority under 35 U.S.C. 119(e) to U.S. Provisional Application No. 62/574,271, filed Oct. 19, 2017, both of which are incorporated herein by reference in their entirety.

FIELD OF TECHNOLOGY

The present disclosure generally relates to solutions for computer security, and more particularly to systems and methods of identifying malicious intermediate language files.

BACKGROUND

As technology advances, the number of files being kept on computing devices is growing significantly. Computers and mobile devices operate under the control of different operating systems (OS) and usually contain varied installed applications and user files. Moreover, the applications and components of the operating system are regularly updated, as a result of which the very same component may have different versions on different devices, or for different users. The .NET® platform offered by Microsoft® is becoming increasingly popular, contributing to the increase of overall user files. Many applications are being adapted to this technology. One of the key features of the .NET platform is that, regardless of the high-level language of the .NET platform used in creating an application, the compiler converts the initial code into an intermediate language, referred to as Microsoft Intermediate Language (MSIL). MSIL is a set of instructions that are independent of the processor and that can be effectively transformed into machine code.

It should be noted that the quantity of malicious software (such as computer viruses, Trojan horses, Internet worms) is also growing. Oftentimes the criminals who create malicious software also make use of the .NET platform to create the malicious software.

Security applications (such as antivirus applications) employ various methods for detecting malicious software, among which are methods of analysis of files created with the use of the .NET platform.

However, current methods of identifying harmfulness of intermediate language files are resource and time intensive. Therefore, there is a need in the art to improve the process of identifying harmfulness of intermediate language files.

SUMMARY

Disclosed are systems and methods for detection of malicious intermediate language files. In one exemplary aspect, a method is provided for detection of malicious intermediate language files. In this aspect, the method comprises selecting a set of resources from a file being analyzed, wherein the file is an intermediate language file, calculating a perceptive hash of a the set of resources, identifying a degree of similarly between the set of resources and a set of resources from known malicious files by comparing the perceptive hash with perceptive hashes of the set of resources from known malicious files, determining a harmfulness of the file being analyzed based on the degree of similarity and removing or quarantining the file being analyzed when the harmfulness exceeds a predetermined threshold.

According to another exemplary aspect, the method includes wherein the file is a common intermediate language (CIL) file.

According to another exemplary aspect, the method includes identifying a file as the file being analyzed when the file lacks a digital signature from a trusted certification center, and/or when the size or check sum of the file has changed.

According to another exemplary aspect, the method includes applying a filter to the set of resources to determine which of the set of resources was generated by random methods; and discarding a portion of the set of resources that were generated by random methods prior to identifying the degree of similarity.

According to another exemplary aspect, the method includes combining perceptive hashes of malicious files that are known into common hashes by a bit by bit comparison of the perceptive hashes.

According to another exemplary aspect, a system is provided for detecting malicious intermediate language files. In this aspect, the system includes a database comprising hashes of known malicious intermediate language files, a resource allocation module executing on a hardware processor, the resource allocation module configured to select a set of resources from a file being analyzed, wherein the file is an intermediate language file, a hash calculation module, coupled to the resource allocation module, configured to calculate a perceptive hash of the set of resources and an analysis module, coupled to the other modules, configured to: 1) identify a degree of similarly between the set of resources and a set of resources from known malicious files by comparing the perceptive hash with perceptive hashes of the set of resources from known malicious files, 2) determine a harmfulness of the file being analyzed based on the degree of similarity and 3) remove or quarantine the file being analyzed when the harmfulness exceeds a predetermined threshold.

According to another exemplary aspect, a computer-readable medium is provided for detecting malicious intermediate language files, wherein the medium contains thereon instructions that when executed perform the described method above.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detection of malicious intermediate language files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout the disclosure, drawings and claims.

A common intermediate language (CIL) file is an executable file created by a compiler supporting the .NET platform, containing translated code from high-level languages (such as the C# on the .NET platform) into an intermediate language, CIL. In general, a CIL file is a named data area on an information medium. In a particular aspect, a CIL file is an uninterrupted memory area containing translated code from high-level languages of the .NET platform into CIL.

Figure 1:
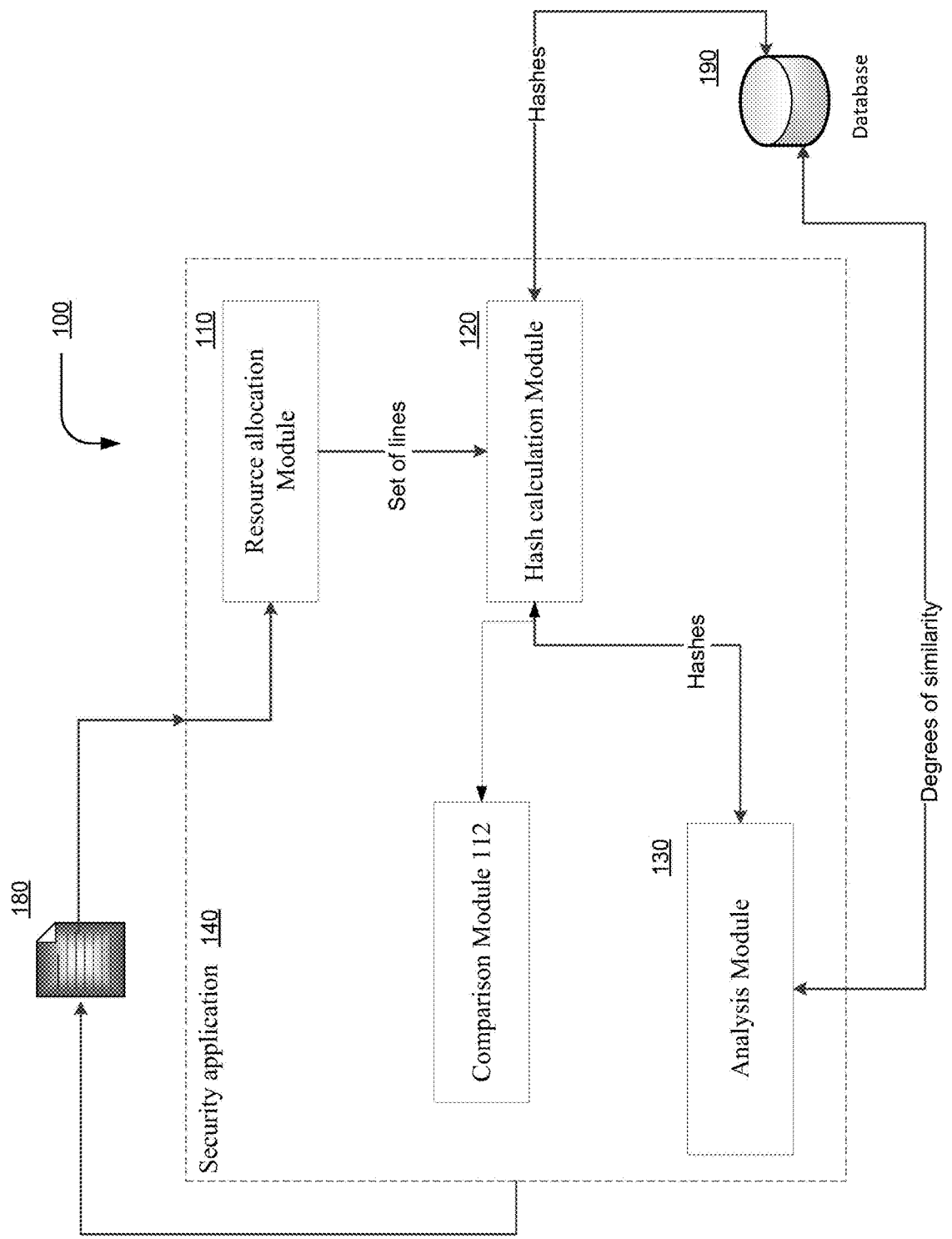
FIG. 1 is a block diagram of a system of identifying malicious intermediate language files according to an exemplary aspect of the present disclosure.

FIG. 1 is a block diagram of a system 100 of identifying malicious intermediate language files according to an exemplary aspect of the present disclosure.

The system 100 of identifying malicious intermediate language files (for example, CIL files) may comprise a security application 140 (such as an antivirus application), and a database 190. In exemplary aspects, the security application 140 may comprise a resource allocation module 110, a hash calculation module 120 and an analysis module 130. In the general case, a security application 140 is running on a computing device. The security application 140 identifies an intermediate language file 180 (for ease of discussion, "CIL file 180") which needs to be analyzed for harmfulness (hereinafter in the text, a file for analysis), and directs the file for analysis to the resource allocation module 110. In one aspect, the security application 140 identifies for analysis a CIL file 180 not having a digital signature from a trusted certification center. In another aspect, the security application 140 identifies for analysis a CIL file 180 whose size or check sum have changed Since the CIL file 180 is a file converted to intermediate code, when updating the .NET Framework on the Windows operating system, such a file may be "reassembled" in order to match the latest .NET version and in this process, the file size or file checksum may be changed. This is an example of why, for example, a white list will not work correctly for identifying this file as non-malicious because after changing the size or checksum of the file, the file will no longer be considered safe (trusted). In the present disclosure, other static analysis methods are described which can determine whether CIL files are malicious or not, despite checksum or size changes (i.e., taking into account variability of CIL files). Those of ordinary skill in the art will recognize that while file 180 is referred to as CIL file 180, any other intermediate language file may be substituted and the system 100 would function equally.

In one aspect, the resource allocation module 110 is implemented on a user's device. In another aspect, the resource allocation module 110 is implemented on a remote server or as a cloud service. The resource allocation module 110 is designed to pick out resources from the CIL file for analysis. In the general case, the resource allocation module 110 picks out lines from the resource area of the CIL file. In one aspect, the resource allocation module 110 picks out lines consisting of ANSI characters. In yet another aspect, the resource allocation module 110 determines the linguistic language in which the mentioned allocated lines are composed. After the allocating of the mentioned lines, the resource allocation module 110 determines, with the aid of filters known in the prior art, which of the picked-out ANSI lines was generated by random methods. In the general case, lines generated by random methods are discarded by the resource allocation module 110 from further analysis of the CIL file being analyzed.

The set of picked-out ANSI lines which have not been discarded is sent by the resource allocation module 110 to the hash calculation module 120.

In one aspect, the hash calculation module 120 is implemented on the user's device. In another aspect, the hash calculation module 120 is implemented on a remote server or as a cloud service. The hash calculation module 120 is designed to calculate the perceptive hash of the set of picked-out ANSI lines of the CIL file 180 being analyzed that are received from the resource allocation module 110. The perceptive hash is a hash computed by a method designed to create comparative hashes.

Methods are known in the prior art for computing perceptive hashes. One example of a computation of the perceptive hash by the hash calculation module 120 is the method which uses the Discrete Cosine Transform (DCT).

Let x[m], where m=0, . . . , (N−1), be a set of lines of length N.

The DCT may be defined as:

$$X[n] = \sqrt{\frac{2}{N}} \times \sum_{m=0}^{N-1} x[m] \times \cos\left(\frac{(2m+1) \times n\pi}{2N}\right), (n = 0, \ldots, N-1)$$

This expression can be rewritten as:

$$X[n] = \sum_{m=0}^{N-1} c[n,m] \times x[m], (n = 0, \ldots, N-1)$$

where: c[n,m] is the element of the DCT matrix at the intersection of the line with number n and the column with number m.

The DCT matrix is defined as:

$$c[n,m] = \sqrt{\frac{2}{N}} \times \sum_{m=0}^{N-1} \cos\frac{(2m+1) \times n\pi}{2N}, (n = 0, \ldots, N-1)$$

In one aspect, the DCT matrix may be computed in advance for any given length of line. Thus, the DCT may be represented as:

$$DCT = M \times I \times M'$$

where: M is the DCT matrix, I is the set of lines of quadratic dimension, M' is the inverse matrix.

It should be noted that the low-frequency coefficients of the DCT are the most stable to manipulations with the lines, since the greater portion of the information is generally concentrated in several low-frequency coefficients.

In the given example, the matrix I is the set of allocated ANSI lines, which is supplemented to quadratic dimension (the length of the lines is equal to the number of lines, the length is supplemented by zero characters, empty lines are filled with zero characters). Next, the matrix I is compressed to dimension 32×32. In one aspect, various filters known in the prior art may be applied to the matrix I by comparison module 112. As a result, one gets a matrix I', in the upper left corner of which are found the low-frequency coefficients, while in one aspect the hash calculation module 120 picks out from the upper left corner a block of values 8×8 (for example, the integer values of the ANSI characters). Next, the mean value is computed for all 64 values. In the next step, a sequence of 64 bits is created, wherein for each of the 64 values its corresponding bit is set or cleared depending on whether the value for that bit is greater than or less than the mean value. In the next step, the perceptive hash is calculated, whereby the 64 separate bits are transformed into a 64-bit value. The order of precedence of the bits has no meaning.

The calculated perceptive hash (the 64-bit value) is sent by the hash calculation module 120 to the analysis module 130. In one aspect, the perceptive hashes of the allocated ANSI lines of CIL files known to be malicious may be calculated by the hash calculation module 120 beforehand and kept in a database 190, the database 190 also keeping the identifier of the known malicious CIL file corresponding to the calculated perceptive hash. The analysis of the known malicious CIL files for harmfulness will have been done earlier by any one of the known methods of the prior art or a combination of these.

In one aspect, the analysis module 130 is implemented on the user's device. In another aspect, the analysis module 130 is implemented on a remote server or as a cloud service. The analysis module 130 is designed to identify harmfulness of the CIL file 180 being analyzed on the basis of the results of a comparison of the perceptive hash computed by the hash calculation module 120 for the set of picked-out ANSI lines of the file 180 being analyzed and the perceptive hashes of known malicious CIL files.

In one aspect, for the comparison the degree of similarity is calculated for the sets of ANSI lines picked out from the CIL file 180 being analyzed and a known malicious CIL file. In the general case, the degree of similarity is a numerical probabilistic value, and the higher it is, the greater the similarity of the sets of ANSI lines picked out. In the general case, the calculation of the degree of similarity makes use of the Hemming distance, using for the comparison the number of different bits in the perceptive hashes. A zero distance indicates that the sets of allocated ANSI lines are probably identical, the degree of similarity of the sets of picked-out ANSI lines being compared being equal to 1. A distance of 5 indicates that the sets of picked-out ANSI lines are different, yet similar to each other, the degree of similarity being high (such as 0.75). If the distance is 10 or more, it is probable that they are totally different sets of picked-out ANSI lines, whose degree of similarity is low (such as 0.1). In one aspect, the values of the correspondences of the degree of similarity to the Hemming distance may be kept in a database 190. In another aspect, a comparison module 112 uses a threshold value (for the degree of similarity or for the Hemming distance). In yet another aspect, the closest perceptive hashes of known malicious CIL files in terms of Hemming distance are combined by the comparison module 112 into common (generic) hashes by a bit-by-bit combination of the perceptive hashes. This may be useful in identifying a group of similar CIL files if the known malicious CIL files (or a family of malicious CIL files) update the set of ANSI lines from one version to another, the set of ANSI lines not changing significantly, and it is not feasible to memorize all sets of ANSI lines corresponding to all versions of the known malicious CIL file (and, accordingly, make a comparison with all sets of ANSI lines).

If the threshold value is exceeded (for example, the threshold value is 0.9, the calculated degree of similarity is 0.99), the sets of ANSI lines are considered to be similar, and the analysis module 130 makes a decision that the CIL file 180 being analyzed is malicious.

In the general case, the decision as to the harmfulness of the CIL file 180 being analyzed is sent by the analysis module 130 to the security application 140.

The security application 140, in the event of receiving a decision as to the harmfulness of the CIL file 180 being analyzed from the analysis module 130, performs an action to ensure the security of the computing device. In one aspect, the security application 140 removes the CIL file 180 being analyzed. In another aspect, the security application 140 places the CIL file 180 being analyzed in quarantine. In yet another aspect, the security application 140 blocks the activity of the CIL file 180, for example, network or file activity.

Figure 2:
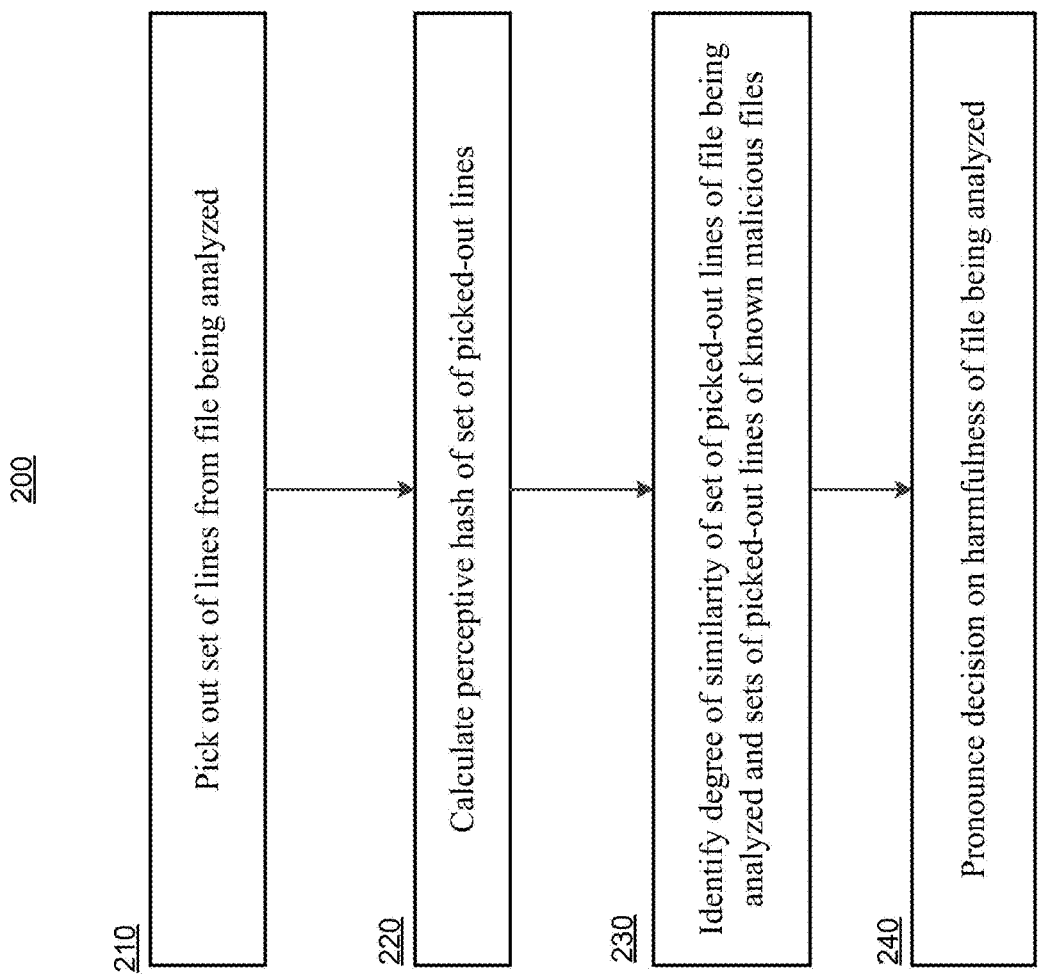
FIG. 2 is a flowchart for a method of identifying malicious CIL files according to an exemplary aspect of the present disclosure.

FIG. 2 is a flowchart for the method 200 of identifying malicious intermediary language files. The method 200 is an exemplary implementation of portions of the system 100, for example the resource allocation module 110, the comparison module 112, the hash calculation module 120 an the analysis module 130 as executed on a computer system such as the computer system 20 shown in FIG. 3.

In step 210 the resource allocation module 110 is used to pick out a set of lines from the file 180 being analyzed, wherein the file being analyzed contains translated code from high-level languages to an intermediate language. In the general case, the file being analyzed is an intermediate language file such as a CIL file, though not limited thereto. In one aspect, lines in ANSI format are picked out.

In one aspect, the resource allocation module 110 discards lines generated at random from the identified set of lines.

In step 220 the hash calculation module 120 is used to compute the perceptive hash of the set of lines picked out.

In one aspect, the perceptive hash is computed by the hash calculation module 120 by using the discrete cosine transform.

In step 230 the analysis module 130 is used to identify the degree of similarity of the set of lines picked out from the file 180 being analyzed to sets of lines picked out from known malicious files by a comparing of the perceptive hashes, the degree of similarity being a numerical probabilistic quantity, which is higher as the similarity of the sets of lines picked out from the mentioned file and the known file is greater.

In step 240 the analysis module 130 makes a decision on the harmfulness, based on the results of the comparison. In the event that the degree of similarity of the mentioned set of lines picked out from the file 180 being analyzed exceeds a threshold value, the file 180 being analyzed is recognized as malicious by the analysis module 130.

Figure 3:
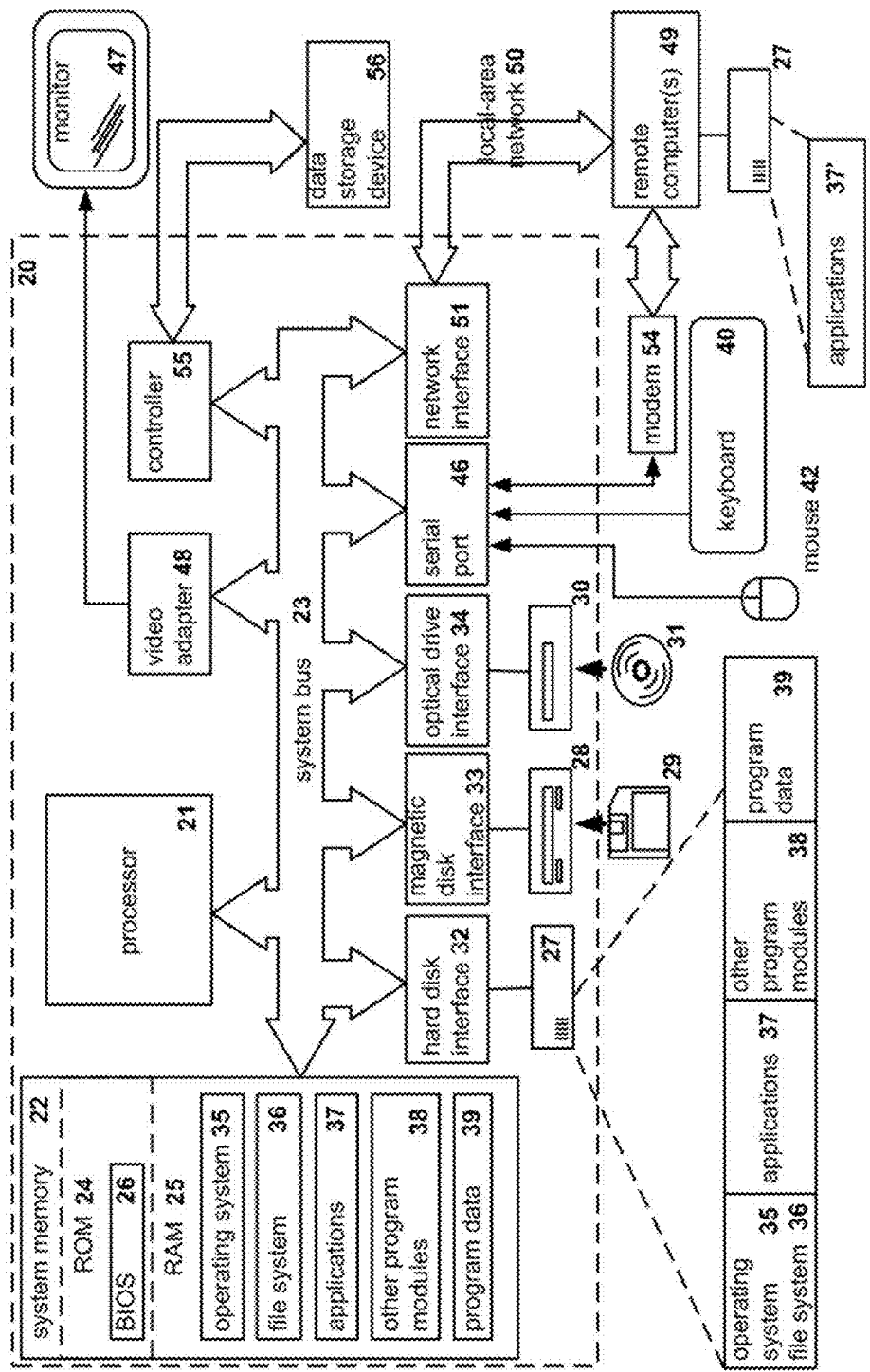
FIG. 3 presents an example of a general-purpose computer system on which the present disclosure may be implemented according to an exemplary aspect of the present disclosure.

FIG. 3 is a diagram illustrating a general-purpose computer system on which aspects of systems and methods of detection of malicious intermediate language files may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, supra). Accordingly, each module may be realized in a variety of suitable configurations, and should not be limited to any particular implementation exemplified herein.

In the interest of clarity, not all of the routine features of the aspects are disclosed It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious intermediate language files comprising:
    selecting a set of resources from a file being analyzed, wherein the file is an intermediate language file and wherein the resources are lines of code from the file, the lines comprising ANSI characters;
    calculating a perceptive hash of a the set of resources;
    identifying a degree of similarly between the set of resources and a set of resources from known malicious files by comparing the perceptive hash with perceptive hashes of the set of resources from known malicious files;
    determining a harmfulness of the file being analyzed based on the degree of similarity; and
    removing or quarantining the file being analyzed when the harmfulness exceeds a predetermined threshold.

2. The method of claim 1, wherein the file is a common intermediate language (CIL) file.

3. The method of claim 1, further comprising:
    identifying a file as the file being analyzed when the file lacks a digital signature from a trusted certification center, and/or when the size or check sum of the file has changed.

4. The method of claim 1, further comprising determining a linguistic language of the lines.

5. The method of claim 1, further comprising:
    applying a filter to the set of resources to determine which of the set of resources was generated by random methods; and
    discarding a portion of the set of resources that were generated by random methods prior to identifying the degree of similarity.

6. The method of claim 1, wherein the degree of similarity is a numerical probabilistic value, and a higher degree of similarity than a predetermined threshold indicates a greater similarity between the file being analyzed and the malicious files.

7. The method of claim 1, further comprising: combining perceptive hashes of malicious files that are known into common hashes by a bit by bit comparison of the perceptive hashes.

8. A system for detecting malicious intermediate language files comprising:
    a database comprising hashes of known malicious intermediate language files; and
    a hardware processor configured to execute:
        a resource allocation module configured to select a set of resources from a file being analyzed, wherein the file is an intermediate language file and wherein the resources are lines of code from the file, the lines comprising ANSI characters;
        a hash calculation module, coupled to the resource allocation module, configured to calculate a perceptive hash of the set of resources; and an analysis module, coupled to the other modules, configured to:
            identify a degree of similarly between the set of resources and a set of resources from known malicious files by comparing the perceptive hash with perceptive hashes of the set of resources from known malicious files;
            determine a harmfulness of the file being analyzed based on the degree of similarity; and
            remove or quarantine the file being analyzed when the harmfulness exceeds a predetermined threshold.

9. The system of claim 8, wherein the file is a common intermediate language (CIL) file comprising one or more lines of CIL.

10. The system of claim 8, wherein the resource allocation module is further configured to:
    identify a file as the file being analyzed when the file lacks a digital signature from a trusted certification center, and/or when the size or check sum of the file has changed.

11. The system of claim 8, wherein the resource allocation module is further configured to determine a linguistic language of the lines.

12. The system of claim 8, wherein the resource allocation module is further configured to:
    apply a filter to the set of resources to determine which of the set of resources was generated by random methods; and discard a portion of the set of resources that were generated by random methods prior to identifying the degree of similarity.

13. The system of claim 8, wherein the degree of similarity is a numerical probabilistic value, and a higher degree of similarity than a predetermined threshold indicates a greater similarity between the file being analyzed and the malicious files.

14. The system of claim 8, further comprising:
    a comparison module configured to combine perceptive hashes of malicious files that are known into common hashes by a bit by bit comparison of the perceptive hashes.

15. A non-transitory computer-readable medium storing thereon executable instructions that when executed by a hardware processor perform a method for detecting malicious intermediate language files comprising:
    selecting a set of resources from a file being analyzed, wherein the file is an intermediate language file and wherein the resources are lines of code from the file, the lines comprising ANSI characters;
    calculating a perceptive hash of a the set of resources;
    identifying a degree of similarly between the set of resources and a set of resources from known malicious files by comparing the perceptive hash with perceptive hashes of the set of resources from known malicious files;
    determining a harmfulness of the file being analyzed based on the degree of similarity; and
    removing or quarantining the file being analyzed when the harmfulness exceeds a predetermined threshold.

16. The medium of claim 15, wherein the file is a common intermediate language (CL) file.

17. The medium of claim 15, further comprising: identifying a file as the file being analyzed when the file lacks a digital signature from a trusted certification center, and/or when the size or check sum of the file has changed.

18. The medium of claim 15, further comprising determining a linguistic language of the lines.

19. The medium of claim 15, further comprising: applying a filter to the set of resources to determine which of the set of resources was generated by random methods; and discarding a portion of the set of resources that were generated by random methods prior to identifying the degree of similarity.

20. The medium of claim 15, wherein the degree of similarity is a numerical probabilistic value, and a higher degree of similarity than a predetermined threshold indicates a greater similarity between the file being analyzed and the malicious files.

21. The medium of claim 15, further comprising: combining perceptive hashes of malicious files that are known into common hashes by a bit by bit comparison of the perceptive hashes.

\* \* \* \* \*